United States Patent Office 3,392,034
Patented July 9, 1968

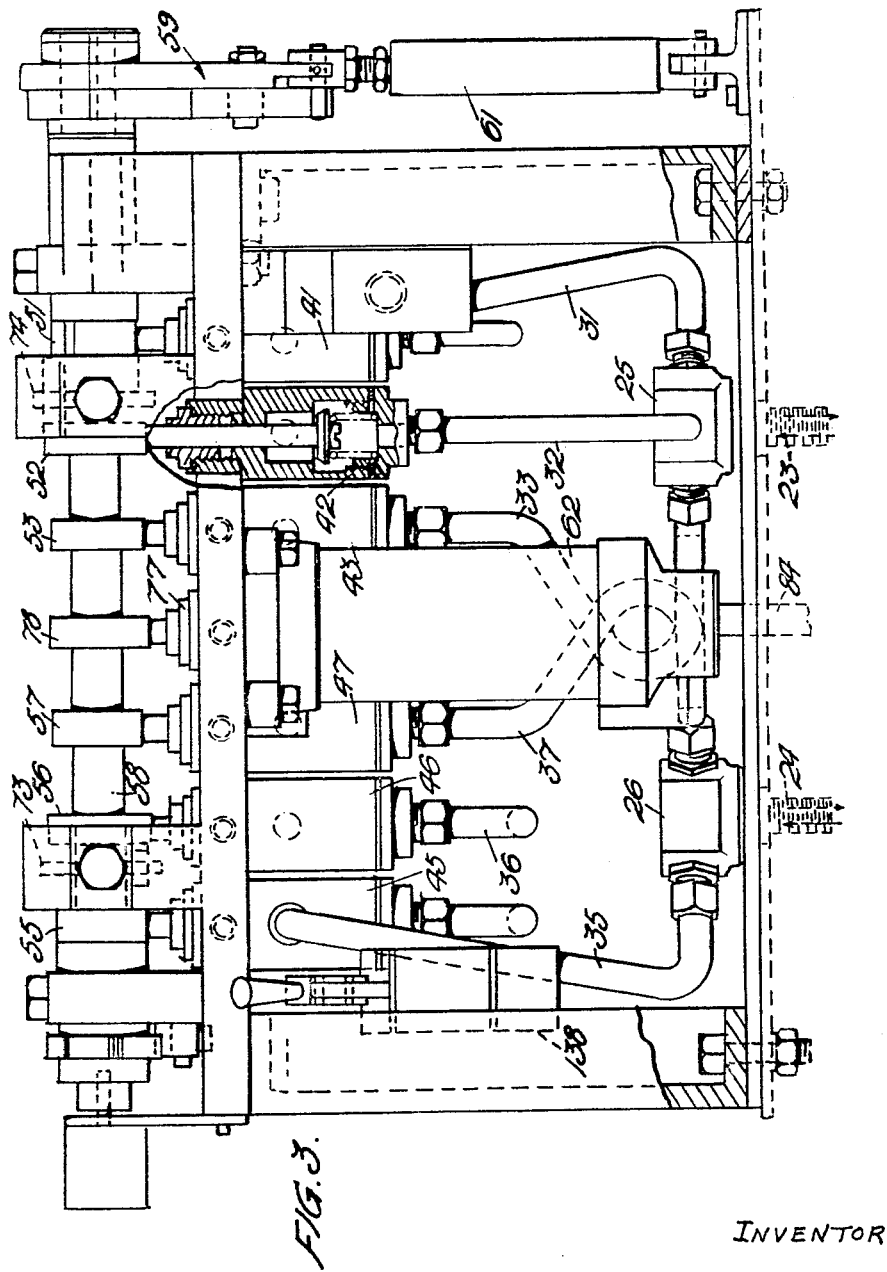

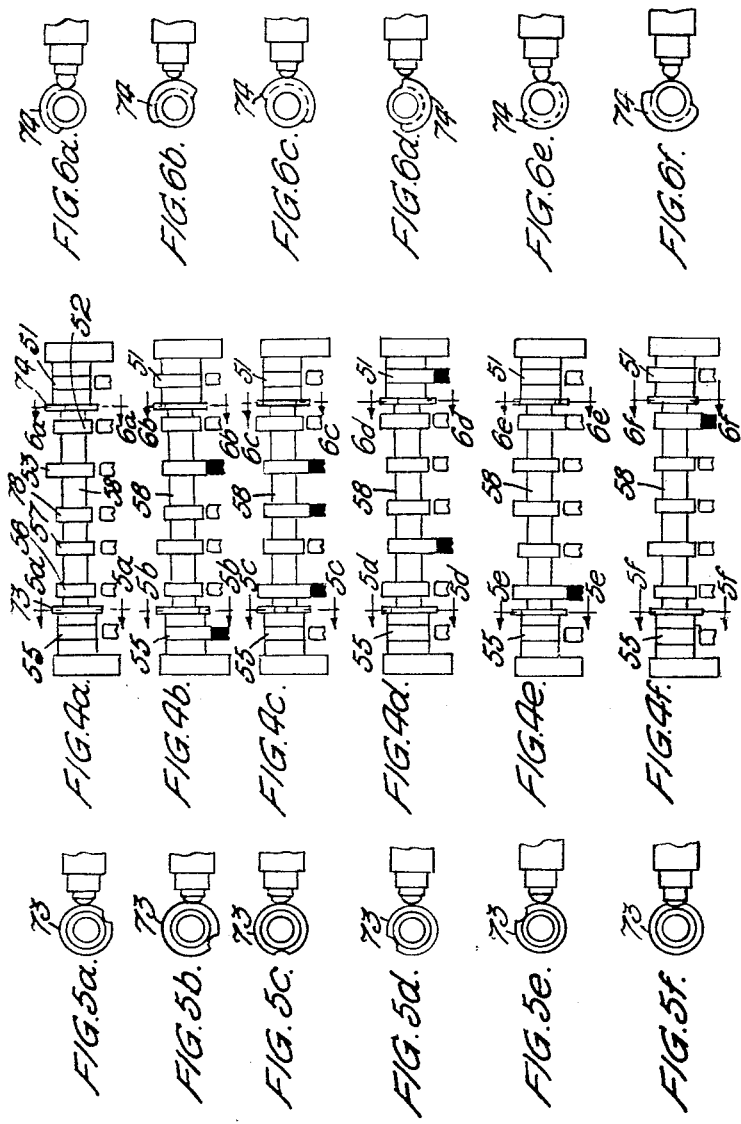

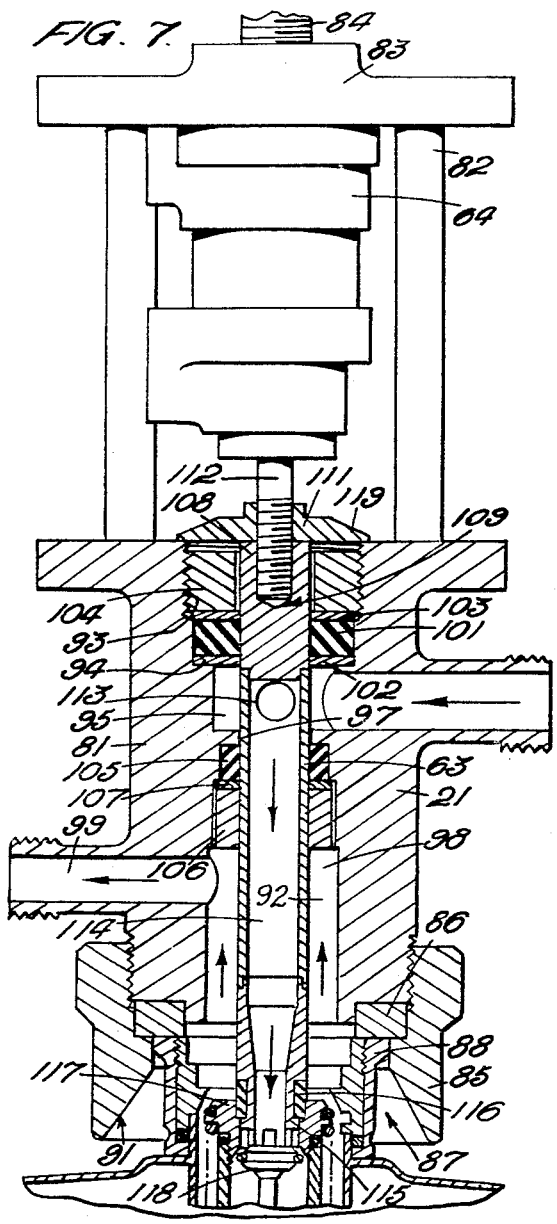

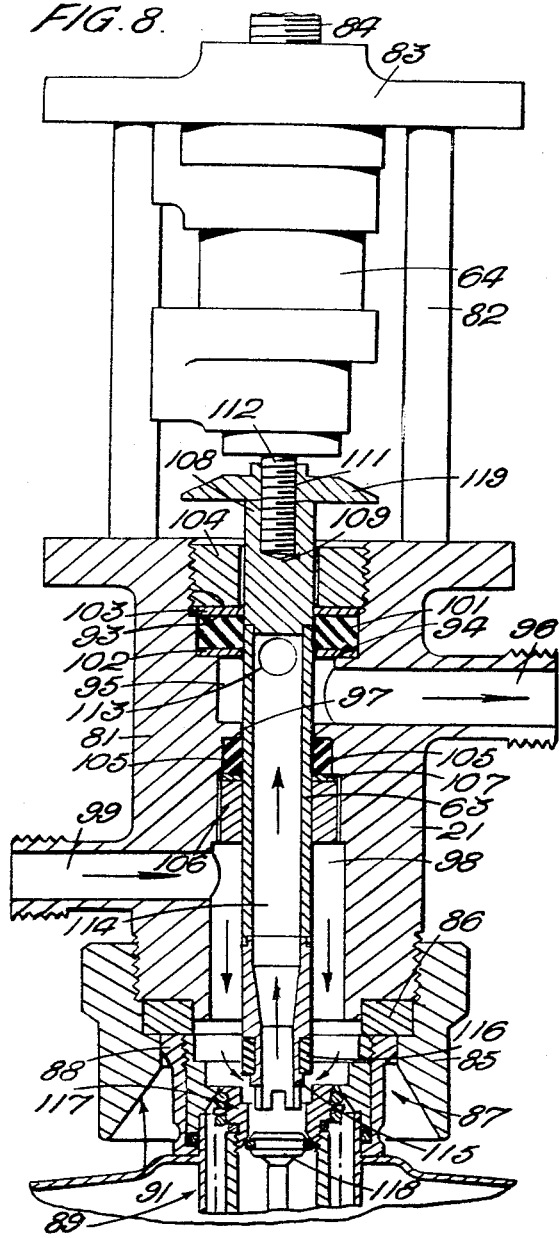

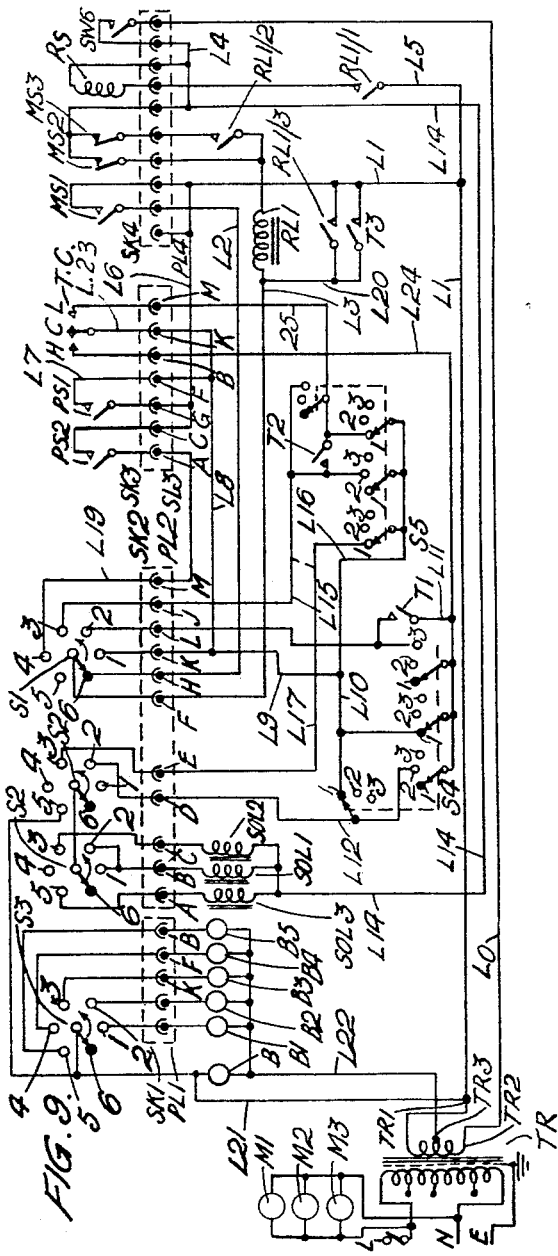

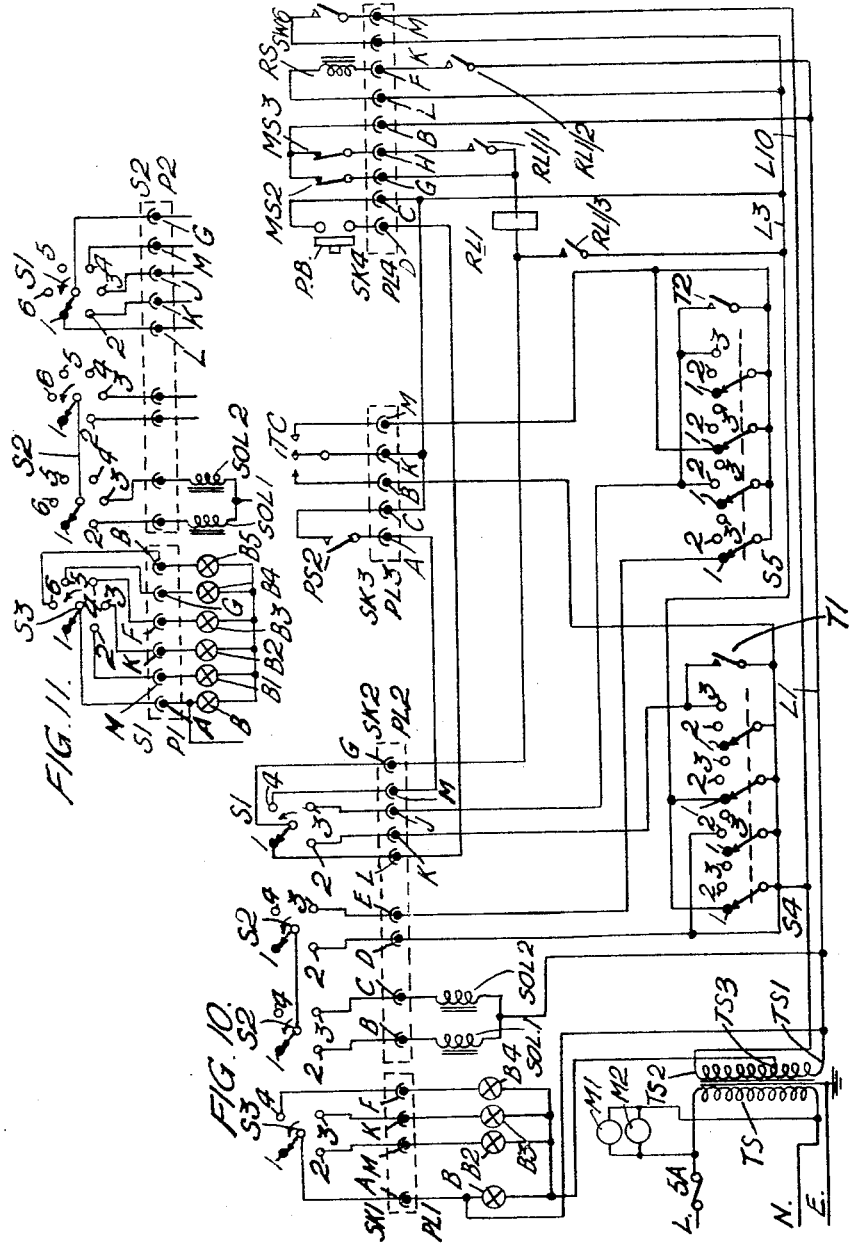

3,392,034
METHODS OF AND APPARATUS FOR STERILIZING AND FILLING BARRELS
Alonzo Roy Trevallon Barnes, Bradmore, Wolverhampton, England, assignor to Joseph Sankey & Sons Limited, Bilston, England, a British company
Filed Mar. 11, 1963, Ser. No. 264,391
Claims priority, application Great Britain, Mar. 12, 1962, 9,449/62
5 Claims. (Cl. 99—182)

The invention relates to methods and apparatus for sterilizing and filling barrels, e.g., beer barrels.

According to one aspect, the invention provides a method of automatically sterilizing and filling beer barrels and the like comprising the steps of passing heated sterilizing fluid (e.g., steam) into a barrel until the barrel is sterilized, withdrawing the sterilizing fluid and replacing it with a sterile coolant fluid, and filling the barrel with beer or like fluid, wherein the steps of passing the heated sterilizing fluid into the barrel and its withdrawal and replacement by the coolant fluid are controlled by the temperature of the fluid carrying out the said steps. The fluids preferably are fed into the barrel through a first conduit and pass from the barrel into a second conduit, in which second conduit the temperature of the fluid is taken.

According to another aspect of the invention there is provided a method of sterilizing and filling beer barrels or the like, comprising the steps of connecting two conduits to the barrel, by means of the conduits passing a sterilizing fluid into the barrel, withdrawing it and replacing it with a coolant, passing beer from a container through one of the conduits into the barrel, disconnecting the conduits from the barrel when the latter is filled and connecting the said one conduit to a source of pressure and to a separate receptacle so that any beer remaining in the said one conduit is returned to the said separate receptacle. Preferably the other of the conduits is connected to the pressure source and the two conduits are placed in communication after they are removed from the barrel so the pressure source is connected to the first conduit as aforesaid.

According to yet another aspect of the invention there is provided apparatus for carrying out the method set forth in the preceding paragraph, which apparatus comprises a racking head for use with an appropriate fitting on the barrel which racking head is adapted to seal against the said fitting and includes parts of the two conduits, means for opening two passages of the fitting whereby the conduits are respectively connected to the passages, and means for placing the two conduits in communication when the passages in the fitting are closed and preferably when the racking head is sealing against the fitting.

For the foregoing methods a convenient sterilizing fluid is steam and a convenient coolant fluid is carbon dioxide.

One embodiment of the invention will now be described by way of example with reference to the accompanying drawings.

In the drawings:

FIGURE 3 is a view of a detail of the machine;

FIGURE 4a is a detail of the cam shaft with a number of cams thereon;

FIGURES 4b, 4c, 4d, 4e and 4f show the cam shaft of FIGURE 4a in various positions;

FIGURES 5a, 5b, 5c, 5d, 5e and 5f are sections on lines 5a—5a, 5b—5b, 5c—5c, 5d—5d, 5e—5e and 5f—5f of FIGURES 4a, 4b, 4c, 4d, 4e and 4f respectively;

FIGURES 6a, 6b, 6c, 6d, 6e and 6f are sections on lines 6a—6a, 6b—6b, 6c—6c, 6d—6d, 6e—6e and 6f—6f of FIGURES 4a, 4b, 4c, 4d, 4e and 4f respectively;

FIGURES 7 and 8 are sections through the filling head of the machine, in beer filling and "beer save" positions respectively;

FIGURE 9 shows the electric circuit of the machine;

FIGURE 10 shows the electric circuit of a modified machine; and

FIGURE 11 shows a modification of the circuit of FIGURE 10.

Figure 1:
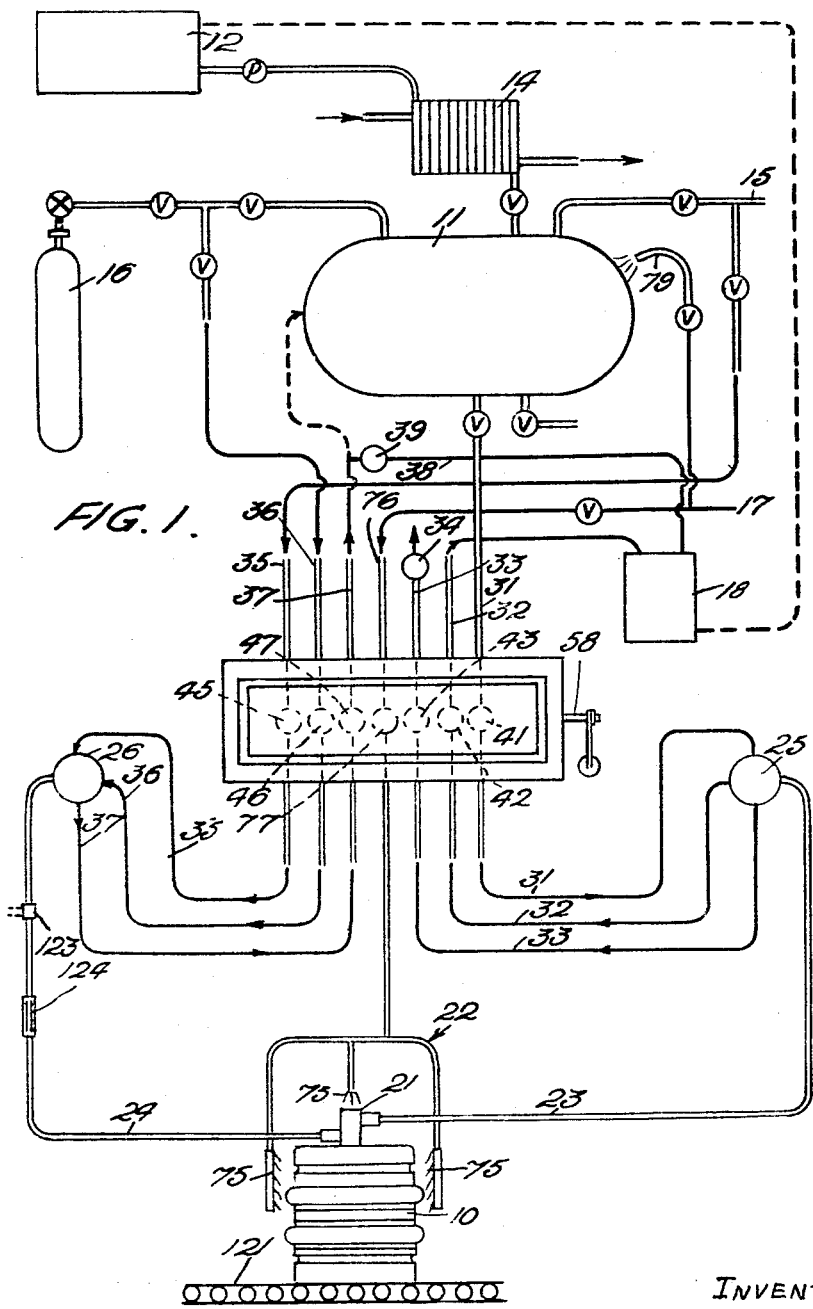
FIGURE 1 is a diagrammatic layout of a machine of the invention, but not showing the pneumatic circuit.
Figure 2:
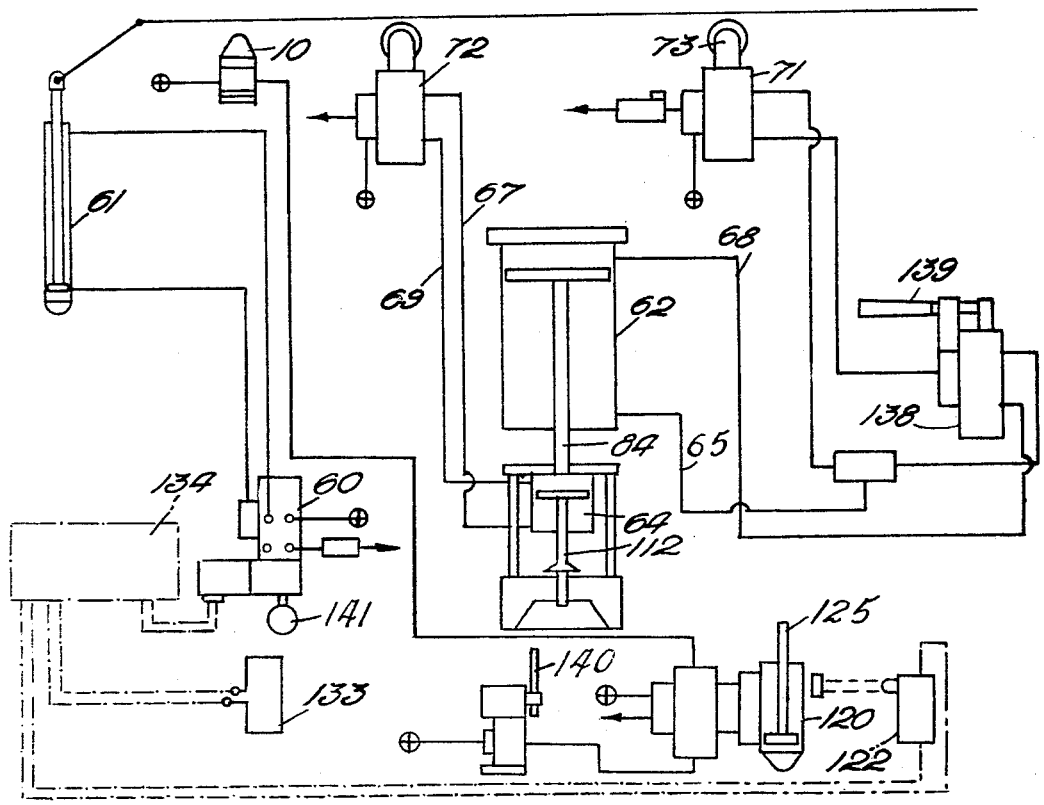
FIGURE 2 shows the pneumatic circuit of the machine.

Referring now to the FIGURES 1 to 8, the machine is provided for sterilizing and filling beer barrels 10 having fittings as described in my corresponding United States patent application, Ser. No. 185,481, filed on Apr. 5, 1962 and now abandoned. The machine comprises a pressurised buffer cylinder 11 containing beer or like fluid fed from a main beer tank 12 through a heat exchanger or filter 14, a source of steam or other sterilizing fluid 15, a source of carbon dioxide or other sterile coolant fluid under pressure 16, a source of air pressure, a source of water 17 and a beer return or save receptacle 18. The machine further comprises a head unit 22 including a filling head 21 that incorporates two conduits 23 and 24. These conduits 23 and 24 are connected respectively to two headers 25 and 26. Three ducts lead from each header. One of the ducts 31 leading from the first header 25 is connected to the outlet of the buffer cylinder 11, the second 32 to the beer return receptacle 18 and the third 33 is connected to drain through a 5 p.s.i. non-return or blow-off valve 34. Two of the ducts 35 and 36 leading from the second header 26 are connected respectively to the source of steam 15 and carbon dioxide 16 whilst the third 37 is connected to a beer return line 38 which leads through a nonreturn or blow-off valve 39 set at 5 p.s.i. to the beer return receptacle 18. The ducts 31, 32, 33, 35, 36 and 37 each incorporate a valve 41, 42, 43, 45, 46 and 47 respectively (see FIGURE 3) and the six valves are arranged for operation respectively by six cams 51, 52, 53, 55, 56 and 57 mounted on a cam shaft 58. This cam shaft 58 is rotatable through a ratchet device 59 by an air cylinder 61 (hereinafter referred to as the "ratchet cylinder") into six positions. The operation of the ratchet cylinder 61 is controlled by a valve (hereinafter referred to as the "ratchet valve") 60 operated by a solenoid (hereinafter referred to as the "ratchet solenoid") RS. The filling head 21 (see FIGURES 7 and 8) which will be described in detail hereinafter, is movable within the head unit 22 by a double acting pneumatic cylinder 62 (hereinafter referred to as the "head cylinder") (see FIGURE 2) from an upper inoperative position to a lower operative position. The filling head 21 includes a probe 63 which is movable within the head 21 by another double acting pneumatic cylinder 64 (hereinafter referred to as the "probe cylinder") from an upper position to a lower position. The head and probe cylinders each have two pneumatic ducts (viz. "raise" ducts 65 and 67 and "lower" ducts 68 and 69) which are connected alternately to the source of air pressure through selector valves 71 and 72 for operation thereby. The two selector valves 71 and 72 are operated respectively by cams 73 and 74 mounted on the cam shaft 58.

A three part water spray 75 is arranged in the head unit 22 to spray water on to a barrel 10 positioned below the filling head 21. This spray 75 is connected to the source of water supply 17 through a duct 76 controlled by a valve 77 operable by a further cam 78 carried on the cam shaft 58. A further spray 79 is connected to the source of water supply 17 and sprays water on to the buffer cylinder 11.

The various cams 51, 52, 53, 55, 56, 57, 73, 74 and 78 are shaped and arranged on the cam shaft 58 so that in the various positions of the cam shaft 58 the following connections are made:

First position

Head cylinder "lower" duct 68 and probe cylinder "raise" duct 67 to air source.

Second position

Head and probe cylinder "lower" ducts 68 and 69 to air source. Steam duct 35 and drain duct 33 to the respective headers 26 and 25.

Third position

Head and probe cylinder "lower" ducts 68 and 69 to air source. Carbon dioxide duct 36 and drain duct 33 to the respective headers 26 and 25. Spray 75 to water supply duct 76.

Fourth position

Head and probe cylinder "lower" ducts 68 and 69 to air source. Duct 31 from beer cylinder outlet and beer line 37 to the respective headers 25 and 26.

Fifth position

Head cylinder "lower" duct 68 and probe cylinder "raise" duct 67 to air source. Carbon dioxide duct 36 and duct 32 to beer return receptacle 18 to respective headers 26 and 25.

Sixth position

Head cylinder "raise" duct 65 to air source. All other ducts closed.

The cam 74 for the probe cylinder "raise" and "lower" ducts 67 and 69 connects these to the air source while the cam shaft 58 is moving from its first to its second position before the steam and drain ducts 35 and 33 are connected to their headers 26 and 25.

The filling head 21 comprises a hollow body 81 (see FIGURES 7 and 8) within which the probe 63 is slidable. At its upper end the filling head body 81 is connected by a pair of spacing rods 82 to a top mounting 83 which is carried by the ram 84 of the head cylinder 62. At its lower end the filling head body 81 has screwed thereto a filling head nut 85. The nut 85 and the body 81 are stepped so that a main washer 86 may be gripped between the steps and these parts 85 and 81 define, below the main washer 86, an annular space 87 to receive the rim 88 of a beer barrel fitting 89 in such a way that the main washer 86 seals against the rim 88. The base 91 of the nut 85 leading to the annular space 87 is frusto conical in shape to guide the rim 88 to the position in which it seals against the main washer 86.

The bore 92 of the body 81 is stepped to different diameters along its length. At its upper end 93 the bore is of large diameter and internally screwthreaded. It is stepped down to a smaller diameter at 94 to constitute an upper chamber 95 from which leads a first radial conduit 96 connected to the conduit 23 leading to the first header 25. The bore 92 is then reduced again to form a throat 97 through which the probe 63 fits snugly. Finally the diameter of the bore 92 is stepped up to constitute a lower chamber 98 which communicates with the bore of the nut 85 and from which leads a second radial conduit 99 connected to the conduit 24 leading to the second header 26.

The lower chamber 98 is internally screwthreaded between the throat 97 and second conduit 99. In the upper enlarged portion 93 of the bore 92 an upper gland seal 101 is held between two gland washers 102 and 103 by an upper gland nut 104 screwed into the bore 92 to seal off the upper chamber 95. A lower gland seal 105 is urged against the throat 97 by a lower gland nut 106 with the inter-position of a washer 107 to seal the chambers 95 and 98 from each other.

The probe 63 is generally cylindrical. Its upper end 108 is mainly solid but has a threaded axial blind bore 109 which receives the threaded end 111 of the piston rod 112 of the probe cylinder 64. A number of ports 113 are formed in the hollow portion 114 of the probe 63 to communicate with the upper chamber 95. The lower end 115 of the probe 63 is castellated and is externally stepped down to a smaller diameter above the castellations at which position the probe 63 is surrounded by a nozzle seal 116. The length of the probe 63 is such that with the rim 88 of a fitting 89 sealing against the main washer 86, when the probe 63 is in its upper position it does not open the valves 117 and 118 of the fitting 89 and its bore 114 is in communication with the lower chamber 98 (see FIGURE 8), and when the probe 63 is in its lower position, it opens the aforesaid valves 117 and 118 and its bore 114 is sealed from the lower chamber 98 (see FIGURE 7). A flange cover 119 rests on the upper end of the probe 63.

The machine comprises a gravity feed conveyor 121 leading to below and then away from the filling head 21. A stop 125 movable by an air cylinder 120 actuated by a trigger 140 is located in the path of the conveyor to stop a barrel 10 in such a position that its rim 88 is substantially directly below the head 21. This stop 125 actuates a track microswitch shown at 122 in FIG. 2 and at MS1 in FIG. 9, when struck by a barrel 10.

A temperature gauge is arranged in the drain duct 33. A beer detector 123, which can distinguish beer from fob and foam is arranged in the duct 24. A sight glass 124 may also be provided in the duct 24 adjacent the beer detector 123.

Two detectors (not shown) are provided respectively to detect the pneumatic pressure in the head cylinder 62 and the beer pressure and to close switches PS1 and PS2 (hereinafter referred to as the "head pressure switch" and the "beer pressure switch") respectively when certain minimum pressures are exceeded.

Bulbs B, B1, B2, B3, B4, B5 are provided and these are illuminated to indicate respectively that the machine is connected to mains and each step in the operation of the machine.

The electrical circuit of the machine is shown in FIGURE 9. This circuit comprises in addition to the parts hereinbefore described, a 10 to 1 step-down transformer TR connected to the mains, the secondary coil of which has terminals TR1 and TR2 and an intermediate 5 volt tapping TR3. Three rotary switches S1, S2 and S3 are rotatable with the cam shaft 58. Two sets of manually operable gauged switches S4 and S5 are provided to set the steam programme and cooling programme respectively. Switch S4 has three positions corresponding respectively to the following programmes: (1) steaming period timed, (2) steaming up to temperature then for a set time, and (3) steaming controlled by temperature controller. Switch S5 also has three positions corresponding respectively to the following programmes: (1) cooling period timed, (2) no cooling time, and (3) cooling controlled by temperature controller. An auto/manual switch SW6 is also provided.

Three timer solenoids SOL1, SOL2, SOL3, actuate clutches (not shown) which engage three timer motors, M1, M2, and M3 respectively. Motors M1, M2 and M3 drive cams (also not shown) which close normally open timer switches T1, T2 and T3, after the appropriate preset time has elapsed. A relay RL1, closes normally open switches RL1/1, RL1/2, RL1/3. Two additional cam operated microswitches MS2 and MS3 respectively, are mounted adjacent to the end of cam shaft 58 to sense the position of the ratchet cylinder 61. Switch MS2 is a normally closed contact which is opened by the action of the cam as soon as ratchet cylinder 61 moves from the retracted position. Switch MS3 is a normally open contact which is held closed by the cam profile until the ratchet cylinder 61 is fully extended, i.e., on completion of the indexing of the cam shaft 58 and at this point the contact opens. A temperature controller TC is also provided.

The operation of the machine will now be described. For the purposes of this description assume switches S4 and S5 are both at positions 1. Operation commences with the cam shaft 58 in the sixth position; track microswitch MS1 head pressure switch PS1 and beer pressure switch PS2 are open, the temperature controller is in the cold position and auto/manual switch SW6 is switched to auto.

In the following description the various parts of the electrical circuitry will often be referred to in general as "parts" and in particular merely by their references. It is to be understood that the references L1, L2, etc., refer to the various lines as shown in the circuit diagram.

A beer barrel 10 moves down the conveyor 121 to below the filling head 21 where it is located by the stop 125. The force of the barrel 10 abutting the stop 125 closes the track microswitch MS1. This actuates relay RL1 through L1, MS1, L2, S1, L3, RL1, MS2, L4, SW6 and L0.

When the relay RL1 is energized it closes switches (i) RL1/1 and (ii) RL1/2 and RL1/3. This results in the following:

(i) The ratchet solenoid RS is energized (via L1, L5, RL1/1, L4, SW6 and L0) causing the ratchet valve 60 to actuate the ratchet cylinder 61 and index the shaft 58 to its next position, and (ii) Relay RL1 is held energized through L1, RL1/3, L20, RL1, RL1/2, MS3, L4, SW6 and L0. As a consequence of this action relay RL1 is unaffected by the opening of microswitch MS1 and the change of position of switch S1 brought about by the rotation of shaft 58.

When the ratchet cylinder reaches its fully extended position microswitch MS3 opens isolating relay RL1, which is then de-energized. The switches RL1/1, RL1/2 and RL1/3 are therefore opened. Also the ratchet solenoid RS is de-energized which causes the ratchet cylinder 61 to retract. The ratchet cylinder 61 when fully retracted closes microswitch MS2. As switch S1 has been indexed to the next position and hence has isolated relay RL1 from MS1, the closing of MS2 does not re-energize relay RL1. It will be noted from the foregoing and following description that switch S1 provides this isolating feature in turn for microswitch MS1, head pressure switch PS1, timer switches T1, T2 (or temperature controller TC) and beer pressure switch PS2. As the cam shaft 58 can only rotate in one direction by virtue of the ratchet device, the rotary switch S1 ensures that the control system can never get out of step.

As the consequences of actuating the relay RL1 are always the same, these will not be described in detail in the description of the subsequent sequences.

*First position*

When the cam shaft 58 is indexed to the first position, the head cylinder 62 is connected to the air source and the head 21 is lowered to seal against the rim 88 of the barrel 10. The rotary switches S1, S2 and S3 being rotatable with the cam shafts 58 are moved to their first position. Track switch MS1 is thus isolated. When the pneumatic pressure in the head cylinder 62 is sufficient to ensure sealing between the head 21 and rim 88, the head pressure switch PS1 is closed. The relay RL1 is thus energized through parts L1, L6, PS1, L7, L8, S1, L3, RL1, MS2, L4, SW6 and L0. Consequently the solenoid RS will be energized as aforedescribed and the ratchet cylinder 61 will cause the cam shaft 58 to be indexed to the next position.

*Second position*

In the second position of the cam shaft 58, cylinder 64 is connected to the air source to lower the probe 63 which thus automatically opens the fitting valves 117 and 118 so that these members are in the position shown in FIGURE 7. Steam is then passed through the steam line 35, the header 26 and conduit 24 into the barrel 10 and then via conduit 23 and header 25 and via conduit 33 and blow-off valve 34 to drain.

At the same time the timer solenoid SOL1 will be energized (via parts L1, L6, PS1, L7, L8, L9, L10, S4, L12, S2, SOL1, L14, L4, SW6 and L0) starting the steam period timer. When the appropriate time has elapsed for adequate steaming, the timer switch T1 is closed energizing relay RL1 (via L1, L6, PS1, L7, L8, L9, L10, S4, L11, T1, S1, L3, RL1, MS2, L4, SW6 and L0). The ratchet cylinder is thus caused to index the cam shaft 58 to the next position.

*Third position*

The barrel 10 is cooled by the water spray 75 and carbon dioxide is then passed into the barrel 10 to replace the steam and to clear the barrel 10 of steam and condensate and to create a back pressure against which the barrel is to be filled. The carbon dioxide also assists in cooling the barrel 10.

At the same time the solenoid SOL2 is energized (via L1, L6, PS1, L7, L8, L9, L16, S5, L17, S2, SOL2, L14, L4, SW6 and L0), starting the cool period timer. When the appropriate time has elapsed for adequate cooling and clearing of the barrel 10, the switch T2 is closed energizing relay RL1 (via L1, L6, PS1, L7, L8, L16, S5, T2, L15, S1, L3, RL1, MS2, L4, SW6 and L0). The ratchet cylinder 61 is thus caused to index the cam shaft to the next position.

*Fourth position*

Beer is fed from the buffer cylinder 11 through the conduit 31, header 25 and conduit 23 and into the barrel 10. The overflow of the beer passes into the conduit 24.

When the beer detector 123 detects beer, the beer pressure switch PS2 is closed. This energizes the relay RL1 (via L1, L6, PS2, L19, S1, L3, RL1, MS2, L4, SW6 and L0) so that the ratchet cylinder 61 is caused to index the cam shaft 58 to the next position.

*Fifth position*

The probe 63 is lifted from the fitting valves 117 and 118 allowing these to close and so that the bore 114 of the probe 63 is in communication with the lower chamber 98 of the head 21 (see FIGURE 6). Carbon dioxide is admitted from the conduit 36, the header 26 and conduit 24 and passes through the lower chamber 98, the bore 114 of the probe 63, the upper chamber 95, conduit 96, conduit 23 and header 25 to clear the duct 24, head 21 and duct 23 of beer. This beer is returned to the beer receptacle 18 via duct 32, and this is referred to herein is the "beer save" arrangement.

At the same time, the solenoid SOL3 is energized (via L21, S2, SOL3, L14, L4, SW6 and L0) starting "beer save" period timer. When the appropriate time has elapsed to clear the ducts of excess beer, the switch T3 is closed energizing relay RL1 (via L1, T3, L20, RL1, MS2, L4, SW6 and L0). The ratchet cylinder 61 is thus caused to index the cam shaft 58 to the next position.

*Sixth position*

The head 21 is raised to unseal the conduits from the barrel and allow the barrel 10 to pass down the conveyor 121. The apparatus is now ready to receive the next barrel for processing.

It will be seen that the movement of switch S3 enables each bulb B1, B2, B3, B4 and B5 to be illuminated (via L21, S3, L22) to indicate each stage of operations.

If the switch S4 is turned to its second position, then, in the second position of the cam shaft 58, the solenoid SOL1 will be bypassed altogether. The relay RL1 will be risen to move the temperature controller TC to "high" (via L1, L6, PS1, L7, L23, TC, L24, S4, L12, S2 SOL1, L14, L4, SW6 and L0). Thereafter the timer operates as described above.

If the switch S4 is turned to its third position, then, in the second position of the cam shaft 58, the solenoid SOL1 will be bypassed altogether. The relay RL1 will be energized when the steam temperature has risen to move the temperature controller TC to "high" (via L1, L6, PS1, L7, L23, TC, L24, S4, L9, S1, L3, RL1, MS2, L4, SW6 and L0).

If the switch SW5 is turned to its second position, then the cam shaft 58 will immediately indexed past its third position as the relay RL1 will be immediately energized (via L1, L6, PS1, L7, L8, L16, S5, L15, S1, L3, RL1, MS2, L4, SW6 and L0). Thus there will be no cooling time.

If the switch SW5 is turned to its third position, then, in the third position of the cam shaft 58, the relay RL1 will be energized after the carbon dioxide temperature is low enough to move the temperature controller to "low" (via L1, L6, PS1, L7, L23, TC, L25, S5, L15, S1, L3, RL1, MS2, L4, SW6 and L0).

The switches S4 and S5 may be set at any desired setting so that there are in all nine different programmes that may be provided by the machine.

The auto-manual switch SW6 isolates the control circuitry and allows the machine to be manually operated. Manual operation of a knob 141 on the solenoid valve 60 causes the cam shaft 58 to be indexed to its next position. If the machine is manually operated with the auto-manual switch SW6 in the auto position, the control circuitry will take over where the manual operation ceases and will complete the sequence.

In addition to the parts described above, the machine further comprises an emergency filling head lift valve 138 having a lever 139. This valve 138 is manually operable and is connected to the pneumatic ducts 65 and 68 of the head cylinder 62. At any stage of the cycle of the machine, i.e., for safety and if a faulty beer container is introduced into the machine, the filling head 21 may be lifted off a barrel 10 independently of normal operation of the machine by operating this valve 138. If this valve 138 is operated during the automatic sequence, the circuit will reset to the beginning of the stage reached in the sequence because the head pressure switch PS1 is opened when the head is raised. For example, if the keg is leaking badly during steaming time and the head is raised to reject and replace the keg, then the new keg will receive the full steaming time no matter what proportion of the steam programme has been taken up on the faulty keg.

Because of the use of the blow-off valves 34 and 39 in the beer return duct 37 and drain duct 33 respectively, the whole beer circuit, including the buffer cylinder 11 and beer barrel 10 is maintained under balanced pressure.

The timers incorporated in the circuits are electro-mechanical timers of type E1RemCo. Star D for 24 volt operation with suitably modified connections. Temperature control is obtained from the hot and cold contacts of a thermostat which is placed in the steam exhaust from the barrel.

The invention is not limited to the precise constructional details hereinbefore described. For example, the beer receptacle 18 may be omitted in which case the beer return duct 37 is connected to the buffer cylinder 11 and the beer save duct 32 is connected to the main beer tank 12. Further two machines may be provided side by side and connected to a common buffer cylinder 11 thus increasing the speed of filling the beer barrels.

In the modification shown in FIGURE 10, the electrical circuit is arranged for semiautomatic operation. After manual attachment of the filling head, the automatic sequence of sterilization, cooling and filling is initiated by operating push button PB. As is clear from FIGURE 10, a cam shaft arrangement with only four positions is necessary for this. The last position switches the machine off for manual removal of the filling head. As is clear from FIGURE 11, the arrangement of FIGURE 10 may be modified by means of a cam shaft arrangement into six positions to incorporate the "beer save" step. After the machine has filled the barrel and switched off (fourth position), the raising of the probe (as described under automatic operation at fifth position, see above) has to be carried out manually. Subsequent reoperation of push button PB initiates automatic operation of the machine to carry out the subsequent step of "beer save" as described above. Sixth position turns the machine off.

By incorporating the "beer save" arrangement, a considerable amount of beer in the feed ducts etc. may be saved from waste. By using the "temperature control" thorough sterilizing and/or cooling may be attained independently of the time taken for each sequence.

I claim:

1. Apparatus for sterilizing and filling a liquid container having twin concentric valve-controlled passageways in the container, which apparatus comprises two conduits, a racking head to which the two conduits are connected, which racking head comprises an outer housing having a bore therethrough, a unitary hollow inner member within the bore of the outer housing and defining two fluid passages which communicate respectively with the two conduits, one said fluid passage extending between the outer housing and the inner member and the other fluid passage extending through the hollow interior of the inner member, a seal between the inner member and the outer housing to restrict the extent of the said one fluid passage, sealing means on the outer housing for sealing between the outer housing and a container outlet when the racking head is engaged therewith, valve-actuating abutment means on the said inner member for actuating the two concentric valves of the container, which inner member is axially slidable a short distance relative to the outer housing to connect the two fluid passages separately to the concentric valve-controlled passageways of the container, to isolate the said fluid passages from each other and to open the two concentric valves of the container after sealed engagement of the racking head therewith, means for sterilizing and filling the container through the two conduits, and means to close the valve means before unsealing the racking head from the container.

2. Apparatus as claimed in claim 1, and first pressure means for moving the racking head into sealing engagement with the outlet of the container, and second pressure means for subsequently sliding the said inner member relative to the outer housing of the racking head to open the valves of the two valve-controlled passageways.

3. Apparatus as claimed in claim 1, in which the valve-actuating member opens first one and then the other of the valves of the two valve-controlled passageways.

4. Apparatus as claimed in claim 1, in which the said two fluid passages communicate with each other when the racking head is in position on the container and the said inner member is moved away from the valve so that the valves are closed.

5. A method of sterilizing and filling a liquid container having valve means for controlling the passage of fluid into and out of the container, comprising connecting two conduits in sealed engagement with the container while maintaining said valve means closed, moving an open end of one of said conduits in one direction to contact and open said valve means to establish communication between both of said conduits and the interior of the container, passing a sterilizing fluid in vapor phase into the container through a said conduit and withdrawing excess sterilizing fluid from the container through the other of the conduits, thereafter introducing a liquid into the container through a said conduit to fill the container, moving said one conduit in the other direction a distance sufficient to close said valve means and to space said open end from said valve means and to place the two conduits in communication with each other, passing gas sequentially through the two conduits to remove liquid therefrom, and thereafter disconnecting the two conduits from the container.

(References on following page)

References Cited

UNITED STATES PATENTS

| | | | |
|---|---|---|---|
| 2,003,651 | 6/1935 | Karnopp | 21—78 |
| 2,102,208 | 12/1937 | Kronquest | 99—182 |
| 2,296,974 | 9/1942 | Beal | 99—182 |
| 2,835,003 | 5/1958 | Abrams | 21—78 |
| 2,897,082 | 7/1959 | Kaiser | 99—49 |
| 2,973,267 | 2/1961 | Keller et al. | 99—182 |
| 3,173,504 | 3/1965 | Thorsson et al. | 177—70 |

FOREIGN PATENTS

| | | |
|---|---|---|
| 677,329 | 8/1952 | Great Britain. |
| 400,374 | 10/1933 | Great Britain. |
| 430,172 | 6/1935 | Great Britain. |

ALVIN E. TANENHOLTZ, *Primary Examiner.*

A. LOUIS MONACELL, *Examiner.*

D. M. NAFF, D. M. STEPHENS, *Assistant Examiners.*